(12) United States Patent
Milani Comparetti et al.

(10) Patent No.: US 8,042,182 B2
(45) Date of Patent: Oct. 18, 2011

(54) METHOD AND SYSTEM FOR NETWORK INTRUSION DETECTION, RELATED NETWORK AND COMPUTER PROGRAM PRODUCT

(75) Inventors: Paolo Milani Comparetti, Turin (IT); Paolo Abeni, Turin (IT)

(73) Assignee: Telecom Italia S.p.A., Milan (IT)

( * ) Notice: Subject to any disclaimer, the term of this patent is extended or adjusted under 35 U.S.C. 154(b) by 1389 days.

(21) Appl. No.: 10/594,306

(22) PCT Filed: Mar. 30, 2004

(86) PCT No.: PCT/EP2004/003350
§ 371 (c)(1), (2), (4) Date: Sep. 27, 2006

(87) PCT Pub. No.: WO2005/099214
PCT Pub. Date: Oct. 20, 2005

(65) Prior Publication Data
US 2007/0214504 A1    Sep. 13, 2007

(51) Int. Cl.
*G06F 12/14* (2006.01)
*G06F 12/16* (2006.01)
*G08B 23/00* (2006.01)
*H04L 29/06* (2006.01)

(52) U.S. Cl. .......................... 726/23; 713/152; 713/153

(58) Field of Classification Search .................. 726/23; 713/152, 153
See application file for complete search history.

(56) References Cited

U.S. PATENT DOCUMENTS

| | | | |
|---|---|---|---|
| 6,182,146 B1 * | 1/2001 | Graham-Cumming, Jr. | 709/238 |
| 6,415,321 B1 | 7/2002 | Gleichauf et al. | |
| 6,499,107 B1 | 12/2002 | Gleichauf et al. | |
| 7,237,264 B1 * | 6/2007 | Graham et al. | 726/23 |
| 7,305,708 B2 * | 12/2007 | Norton et al. | 726/23 |
| 7,620,988 B1 * | 11/2009 | Hernacki | 726/23 |
| 7,660,248 B1 * | 2/2010 | Duffield et al. | 370/230.1 |
| 7,716,742 B1 * | 5/2010 | Roesch et al. | 726/25 |
| 2002/0032717 A1 * | 3/2002 | Malan et al. | 709/105 |
| 2003/0014662 A1 * | 1/2003 | Gupta et al. | 713/200 |
| 2003/0145226 A1 * | 7/2003 | Bruton et al. | 713/201 |
| 2003/0172291 A1 * | 9/2003 | Judge et al. | 713/200 |

(Continued)

FOREIGN PATENT DOCUMENTS
WO    WO-02/061510 A2    8/2002
WO    WO-2005/015370 A1    2/2005

OTHER PUBLICATIONS

Abbes, Tarek et al. "Protocol Analysis in Intrusion Detection Using Decision Tree", 2004.*

(Continued)

*Primary Examiner* — Michael Simitoski
(74) *Attorney, Agent, or Firm* — Finnegan, Henderson, Farabow, Garrett & Dunner, L.L.P.

(57) ABSTRACT

A system for providing intrusion detection in a network wherein data flows are exchanged using associated network ports and application layer protocols. The system includes a monitoring module configured for monitoring data flows in the network, a protocol identification engine configured for detecting information on the application layer protocols involved in the monitored data flows, and an intrusion detection module configured for operating based on the information on application layer protocols detected. Intrusion detection is thus provided independently of any predefined association between the network ports and the application layer protocols.

35 Claims, 5 Drawing Sheets

U.S. PATENT DOCUMENTS

2004/0098617 A1* 5/2004 Sekar ............................ 713/201
2004/0107361 A1* 6/2004 Redan et al. .................. 713/201

OTHER PUBLICATIONS

Kruegel, Christopher et al. "Service Specific Anomaly Detection for Network Intrusion Detection", 2002.*

Roesch, Martin. "Snort—Lightweight Intrusion Detection for Networks", 1999.*

Yang, Wu et al. "Intrusion detection system for high-speed network", 2004.*

Norton et al.; "The New Snort"; Computer Security Journal Computer Security, vol. 19, No. 3, pp. 37-47, (2003).

Freiss et al.; "Einbrecheralarm Intrusion Detection MIT Snort"; CT Magazin Fuer Computer Technik, vol. 1, No. 8, pp. 212-219, (2001).

Frederick; "Network Intrusion Detection Signatures, Part 5"; Security Focus HOME Infocus, retrieved on Nov. 25, 2004 from http://securityfocus.com/infocus/1569>, pp. 1-4, (2002).

Zhang et al.; "Detecting Backdoors"; retrieved on Nov. 24, 2004 from http://citeseer.ist.psu.edu/rd/0%2C296649%2C1%2CO.25%CDownload/http://citeseer.ist.psu.edu/cache/papers/cs/14185/http:zSzzSzwww.aciri.orgzSzvernzSzpaperszSzbackdoor-sec00.pdf/zhang00detecting.pdf>, pp. 1-11, (2000).

Sun et al.; "Statistical Identification of Encrypted Web Browsing Traffic"; Proc. of IEEE Symposium on Security and Privacy, 13 pages(2002).

* cited by examiner

METHOD AND SYSTEM FOR NETWORK INTRUSION DETECTION, RELATED NETWORK AND COMPUTER PROGRAM PRODUCT

CROSS REFERENCE TO RELATED APPLICATION

This application is a national phase application based on PCT/EP2004/003350 filed Mar. 30, 2004, the content of which is incorporated herein by reference.

FIELD OF THE INVENTION

The present invention relates to network security and, more specifically, to techniques for network intrusion detection.

DESCRIPTION OF THE RELATED ART

Network security systems—such as intrusion detection systems (IDS), intrusion prevention systems (IPS) and firewalls—monitor network traffic on a network with which they are associated in order to detect behavior that is illegal, malicious, in violation of policy, or that otherwise constitutes a misuse of the monitored network. The detection of such behavior constitutes a security event and may trigger a variety of response tasks, such as logging of the traffic that caused the event, alerting a human operator of the event, or disrupting further traffic related to the event with a variety of methods.

A widely used method of recognizing misuse in network traffic consists in comparing the observed traffic with a set of "misuse signatures", or "attack signatures" that identify a set of known misbehaviors, such as network attack attempts, network policy violations, or network protocol violations.

Signatures in a misuse-based network IDS mostly aim at detecting misbehavior specific to a given network protocol. IDSs may also perform a variety of analysis tasks, such as decoding, normalization, or reassembly of the data flow, which tasks are also dependent on the network protocol of the communication.

Most application layer protocols may usually be identified by the use of reserved or standard TCP/UDP port numbers, the detection engine of a conventional IDS may identify the protocol of a given data flow from the TCP/UDP port numbers involved in the flow. TCP and UDP are well known acronyms for Transmission Control Protocol and User Datagram Protocol, respectively.

A disadvantage of this solution is that it makes the assumption that server applications are deployed only at the port numbers that are standard for the application's underlying protocol.

There are several reasons why this assumption may not be correct. A server application may be deployed at a non-standard port because the standard port number is already in use by another server, or to bypass a firewall between the server and some of its potential users, or for other technical reasons. A server application may be deployed at a non-standard port to "hide" it, either for legitimate purposes, to achieve "security by obscurity", or for malicious purposes, to camouflage unauthorized deployment.

Results described in Zhang, Y. and Paxson, V. (2000a) "Detecting Backdoors" in Proc. of the 9th USENIX Security Symposium confirm that, in a production environment, a high number of legitimate servers are often found "listening" on non-standard ports.

The deployment of a given server application at a non standard port may or may not itself constitute a policy violation or misuse of the network. In either case, it may open vulnerabilities in the monitored network, and attacks exploiting these vulnerabilities may evade detection by the IDS coupled to the network. This is because the IDS may not correctly identify the protocol of the data flow containing the malicious data. In other words, an application listening on a non standard port may cause false negatives, that is, misbehavior that goes undetected, for a conventional network IDS.

Protocol identification in a network IDS based on reserved or standard TCP/UDP port numbers suffers from this disadvantage. For that reason a conventional network IDS may allow the security administrator to configure the detection engine. This may occur by specifying for a given protocol one or more ports that are associated with that protocol. In that way, a security administrator can manually decide what protocols are to be associated with each port and, consequently, what analysis tasks are to be performed and what signatures are tested against a given data flow.

A disadvantage of this method lies in that the effectiveness of a manual configuration is limited by the administrator's knowledge of the network, which may be incomplete, and by the highly dynamic nature of most networks, which would require constant update of the configuration.

Conventional network intrusion detection systems may make use of network discovery capabilities, such as active scanning, vulnerability analysis, or passive network mapping. Information thus gathered may be used to reduce the ambiguity inherent in being a passive observer of data flows, and thus improve the quality of detection. As an example, an attack attempt effective against a given operating system may be correlated with the operating system known to be present on the host that is the target of the attack to obtain more reliable information on the security event.

U.S. Pat. No. 6,415,321 B1 discloses a domain mapping method and system based on the use of a storage device for storing information on a network domain, acquired with a variety of methods, including passive capture of the network traffic, and available on the network by use of a query engine for a variety of network devices, including intrusion detection systems. The network information gathered is used to configure the IDS. This information includes operating system, service, and vulnerability information.

U.S. Pat. No. 6,499,107 discloses a method and system for adaptive network security using intelligent packet analysis. This prior art arrangement uses the network information gathered to prioritize the activation of analysis tasks and of misuse signatures on a network IDS, in order to provide a more predictable behavior under overload.

Finally, WO-A-02/061510 discloses a port profiling system adapted to detect unauthorized use of network assets based on the service port numbers involved in communication on the network.

OBJECT AND SUMMARY OF THE INVENTION

The object of the present invention is thus to enhance network intrusion detection systems especially in terms of flexibility and the capability of detecting network intrusion in a manner that is rendered thoroughly independent of the physical configuration of the network.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the invention provides intrusion detection in a network wherein data flows are exchanged using associated network ports and application layer protocols; this is essentially done by monitoring the data flows in the network, detecting information on the application layer protocols involved in said monitored data flows, and providing intrusion detection based on the information on application layer protocols detected. Intrusion detection is thus provided independently of any predefined association between the network ports and the application layer protocols.

Preferably, the arrangement described herein makes use of information on the application layer protocol involved in a given data flow, to decide in real time the appropriate behavior to detect misuse within the data flow, regardless of TCP/UDP ports involved in the communication. Protocol identification is performed by means of passive observation of network traffic, using signature-matching techniques.

In the arrangement described herein, network information is used in real time by the IDS to identify the protocol involved in a given data flow and therefore to correctly analyze the data flow. Furthermore, the arrangement described herein introduces novel methods for performing passive protocol identification, and an efficient technique that permits integration of protocol identification and intrusion detection in a single device.

Preferably, analysis tasks and misuse signatures are not prioritized, nor are they individually enabled and disabled. Rather, a set of analysis tasks and misuse signatures is selected that is appropriate for the protocol of the data flow, amongst a plurality of predefined sets. An advantage of the arrangement described herein is that each signature set does not change as a consequence of new network information, so that processing may be performed once and for all to construct data structures needed for optimized signature matching algorithms such as set wise string matching and decision trees.

Preferably, network information is obtained by passive observation of network traffic. Such a "passive scanning" approach provides several advantages over active scanning. Passive scanning is entirely unobtrusive, cannot be detected, and provides real time information on any device that is active in the network. Conversely, active scanning is noisy, consumes bandwidth, may disrupt normal network operation, is not real time, and may fail to detect network devices that do not reply to the scanning stimuli, such as low uptime devices, devices protected by firewalls, or devices requiring specific stimuli, not available to the vulnerability assessment system, to elicit a response.

Still preferably, the protocol of a given data flow is detected regardless of the port numbers involved in the communication; the use of the information thus gathered is not limited to alerting for out of policy events, but also includes usage within a signature based network IDS.

In the exemplary arrangement described herein, protocol identification is performed based on signature matching and on flow characterization and classification. Real time information on the services deployed in the monitored network, is thus provided regardless of the TCP or UDP port numbers on which these services are deployed. A map of the services deployed on the network is thus constructed, and policy violations or anomalous events generate a security event. Misuse based network intrusion detection is thus enhanced by accurate, real time knowledge of the application layer protocol involved in a given data flow. The set of analysis tasks to perform and the set of misuse signatures to match against the flow are thus identified making it possible to detect misuse attempts directed against a given port without prior knowledge of the application layer protocol listening on the port.

In the exemplary arrangement described herein, protocol identification is performed on a device coupled to the network by observing a given data flow for behavior specific to known protocols. A set of signatures is used, specified in a language similar to a signature language used to specify misuse signatures in a network IDS. As an addition to an ordinary IDS signature language, each signature specifies the protocol that is detected if the signature is triggered. Each signature attempts to match a pattern that is unique to a given protocol, and at the same time is frequently used in that protocol. For that purpose, signatures identifying behavior frequently present in server responses may be used, or signatures identifying common client request-server reply behavior. Signatures exclusively matching a pattern in client behavior are not used: in fact, they could be triggered erroneously or maliciously by users outside the monitored network (see e.g. PCT patent application 03WO-IT00505).

In another preferred embodiment of the invention, the protocol identification method above is refined by flow characterization and classification of data flows relative to each server application deployed on the network. A limited set of features such as packet size, packet arrival times, TCP flags and other header information are gathered and statistics thereof are computed. The flow classification engine then classifies the data flows and services into a number of flow classes. Flow classification performed without payload content inspection is known to permit discrimination between interactive and non-interactive traffic, and even identification of specific protocols such as ssh, or web traffic. The information thus obtained may be correlated with the information gathered by signature based protocol identification to provide more reliable identification. The signature language employed for protocol identification may thus be enriched to allow testing of flow and service characteristics obtained by the flow classifier engine above.

Preferably, protocol identification is used to create and maintain a map of the application layer protocols present in the monitored network, and generate a security event whenever a new protocol is detected in violation of network policy. An advantage of this method is that it provides network and security administrators with an accurate, real time map of the services deployed on the monitored network, regardless of the port numbers used.

Further preferably, a network intrusion detection or prevention system as described herein obtains information on the protocol of each observed data flow, either by making use of the protocol map above, or through online analysis of the data flow with the protocol identification methods described above. This preferably leads to providing an intrusion detection or prevention system that makes use of the information on the application layer protocol involved in a given data flow to select the set of signatures and the set of decoding, analysis, normalization, and reassembly tasks to be performed for the data flow. Matching misuse signatures against network traffic is a resource intensive task of ever growing complexity. Not only does the amount of computation and memory required for this task grow with the bandwidth of the coupled network; this also grows with the number of misuse signatures employed, which in turn must grow as new technologies, protocols and applications are deployed on the network.

A basic advantage of the arrangement described herein lies in that, rather than enabling and disabling individual signatures for a given data flow, a signature set is selected based on the identified protocol. This allows the signature set relative to each protocol to be preprocessed for efficient signature matching, without repeating the preprocessing each time a protocol is identified.

Additionally, an IDS is thus provided that is capable of accurately detecting attacks regardless of the port numbers involved in the communication, even in a fast changing network environment, reducing the amount of false negatives and false positives. Since the tasks performed by the IDS (and by the protocol identification system) are quite similar, both involving the capture of network traffic, a number of preprocessing tasks on the collected flow data, and the matching of the preprocessed flow data against a set of signatures, these two systems may easily and efficiently be integrated into a single system performing both functions.

BRIEF DESCRIPTION OF THE ANNEXED DRAWINGS

The invention will now be described, by way of example only, with reference to the enclosed figures of drawing, wherein.

DETAILED DESCRIPTION OF PREFERRED EMBODIMENTS OF THE INVENTION

Figure 1:
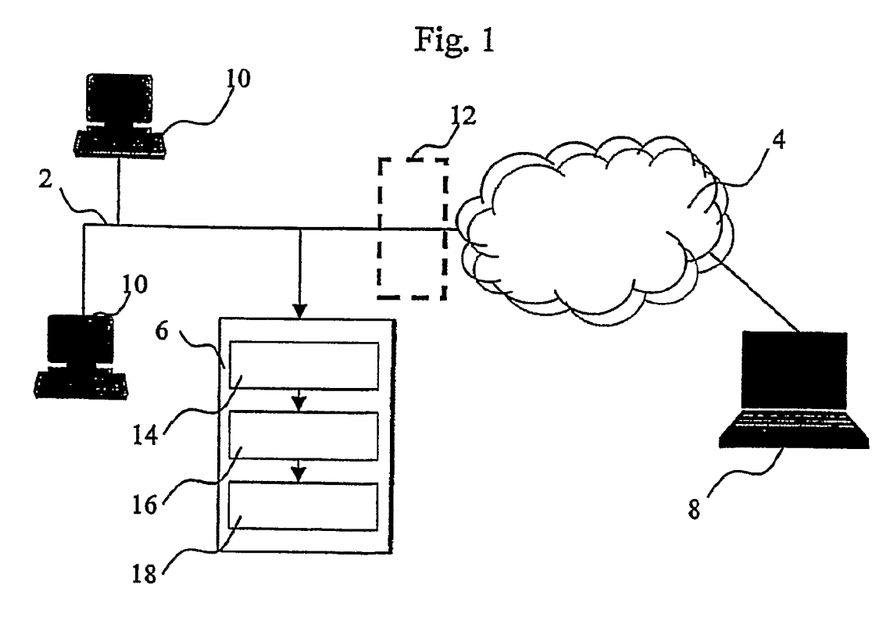
FIG. 1 shows a typical layout of a network intrusion detection device in accordance with the arrangement described herein.

FIG. 1 shows the typical layout of a protocol identification arrangement as described herein.

A network, such as a local area network generally designated 2 and monitored by an intrusion detection system 6, is connected to a public network 4, such as the Internet, and is therefore open to access via a client device 8. A plurality of devices 10 are deployed on the network 2 for exchanging data and sharing resources, accessing the Internet 4, and offering services to clients 8. Between the network 2 and the net 4 a firewall 12, shown in FIG. 1 with a broken line, can be used for limiting external access to resources in the local area network 2 and protecting such resources from unauthorized use.

The intrusion detection system 6 is coupled to the monitored network 2 in order to detect and capture data being transmitted on the network.

The intrusion detection system 6 includes:
a sniffer 14 for capturing data on the network 2,
a protocol identification engine 16 which receives data captured by the sniffer 14, and
an intrusion detection engine 18 which performs the intrusion detection proper by using information obtained by the protocol identification engine 16.

The designation "sniffer" indicates a module that monitors network traffic and can be used to capture data being transmitted on a network. Thanks to the sniffer 14, the network intrusion detection system 6 is able to read any packet of data passed on to the network 2, thus determining the source and destination addresses of the packet and analyzing the corresponding data content as explained in detail hereinbelow.

Figure 2:
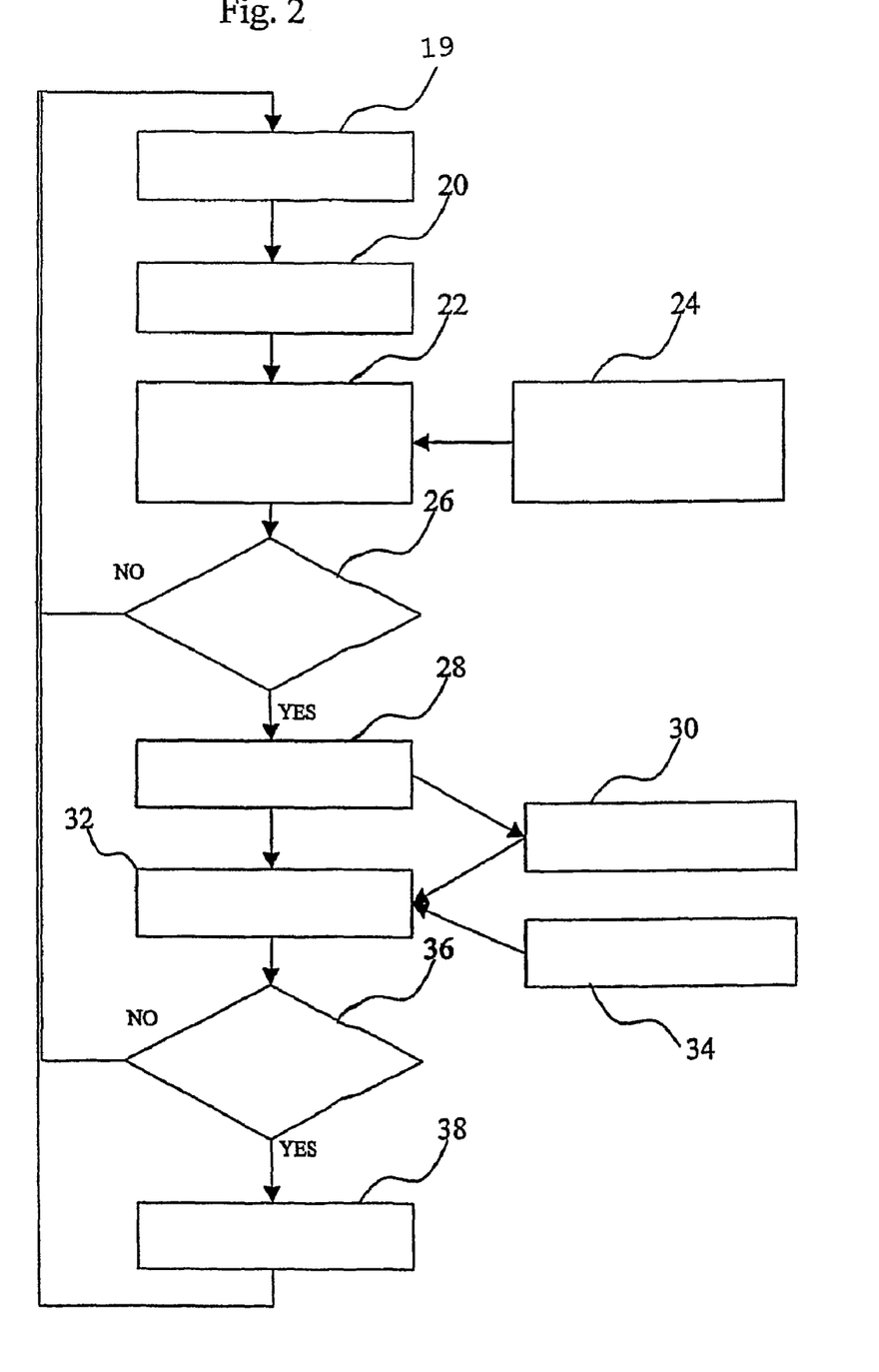
FIG. 2 is a flow chart illustrative of operation of a preferred embodiment of the protocol identification system of FIG. 1.

FIG. 2 is a flow chart illustrating operation of a preferred embodiment of the network intrusion detection system 6. In the exemplary embodiment shown, intrusion detection features are limited to detecting application layer protocols and verifying if said protocols are in compliance with network policies.

In a step 19, the sniffer 14 captures traffic on the network 2. A subsequent preprocessing step 20 includes a plurality of preprocessing tasks on the captured packet. The preprocessing tasks may include a plurality of decoding, analysis, reassembly and normalization tasks, such as IP de-fragmentation, TCP stream state tracking and reassembly, data flow analysis, protocol analysis and normalization. Each of these tasks is, per se, well known in the art, thus making it unnecessary to provide a detailed description herein.

A signature-matching step 22, performed by a corresponding engine, leads to matching a preprocessed data flow against a set of protocol detection signatures 24.

Signatures for protocol identification are specified in a signature language similar to the signature languages employed by conventional network intrusion detection systems.

An example of such a language is the "snort" rule language, that is the language employed to specify detection signatures for the well known open source network intrusion detection system. As is well known, "snort" is the de facto standard for the network IDS. Signatures may specify tests such as comparison of specific header fields of the network packet against a value, search for a predetermined sequence of bytes in the packet payload, as well as stateful tests, that is tests that require memory of specific features of the data flow previous to the packet currently being matched.

As an example, the state of a TCP connection may be tested, a sequence of bytes may be searched for in reassembled stream data, or a specified event may be required to have occurred a specified number of times within a given interval.

A useful test that may be specified in a stateful signature language specifies that a first signature is to be enabled only as a consequence of the triggering of a second signature, and only for a specified set of packets (see again, by way of general reference, PCT patent application 03WO-IT00505). A pattern matching engine for searching attack signatures into data packets is supported by a response analysis engine for detecting response signatures into data packets sent back from a monitored network/computer. When a suspect signature (second signature) has been detected into a packet, the system enters an alarm status starting a monitoring process on the packets sent back from the potentially attacked network/computer, enabling matching tests with the first signature. An alarm is generated only in case the analysis of the response packets produces as well a positive result. The specified set of packets may be limited to the packets in the same data flow as the packet triggering the second signature, or may be further limited to the first packet or application layer protocol data unit captured in reply to the packet or application layer protocol data unit that triggered the second signature.

In the context of protocol identification, such a test may be employed to detect client request—server reply behavior, with the advantage that the number of false positives, that is the number of erroneous protocol identification events, may be greatly reduced.

An example of the use of a stateful signature language for protocol identification is discussed below, for the detection of the FTP protocol. Going back to FIG. 2, in the step 26 a check is made as to whether the protocol identification engine has detected a protocol. If a protocol has been detected, processing proceeds towards a step 28 where a protocol map 30 is updated by inserting information on the newly detected protocol. The protocol map 30 is essentially a data base or data storage system holding information on the detected protocols. The protocol map is further discussed below.

Further in FIG. 2, in a step 32 a policy engine compares the detected protocol in the protocol map 30 with a network policy 34. The network policy 34 is specified by the administrator of the protocol identification system. Such a network policy may assert that specific protocols are not allowed on the monitored network, that servers of specific protocols are not allowed on the monitored network, or that only specific hosts of the monitored network are allowed a server and/or client role in communications employing a given protocol on the monitored network.

Step 36 is essentially a test as to whether the detected protocol is in violation of network policy. If this is the case, processing evolves towards a step 38 where a security event is generated. As a consequence of the security event, operation similar to operation of a conventional intrusion detection system may occur, such as logging of the event, and alerting the administrator of the event.

As an improvement to the arrangement described above, protocol identification may be restricted to data flows involving a server in the monitored network and a client outside the monitored network. Under the assumption that the monitored network is protected by a firewall 12, this has the advantage that the computational cost of protocol identification is reduced. Additionally, the size and therefore memory occupation of the protocol map 30 is reduced, by limiting protocol identification to those security critical services that are accessible through the firewall 12 from outside the monitored network. A further advantage is that this allows security administrators to apply an extremely restrictive network policy 34 to the protocol identification system, while allowing a wide variety of protocols to be employed within the monitored network.

Two preferred embodiments of the protocol map are shown hereinbelow.

| IP Address | IP Protocol | Service Port | Protocol |
|---|---|---|---|
| 131.2.1.15 | TCP | 9999 | ftp(21) |
| 131.2.1.22 | TCP | 16100 | http(80) |

| Client IP | Server IP | IP Protocol | Client Port | Server Port | Protocol |
|---|---|---|---|---|---|
| 218.3.1.25 | 131.2.1.15 | TCP | 1712 | 9999 | ftp(21) |
| 145.12.1.22 | 131.2.1.22 | TCP | 10212 | 16100 | http(80) |
| 173.13.3.11 | 131.2.1.22 | TCP | 8310 | 16100 | http(80) |

All the values in the tables above are provided only as examples of data that might be found in such tables during operation.

The former table shows one preferred embodiment of the protocol map. Such a protocol map is arranged based on the IP addresses of hosts inside the monitored network. For each IP address (column 1) in the monitored network, information may be stored on which service ports (column 3) of which IP protocol (column 2) are listening for which application layer protocol (column 4).

An alternative embodiment is shown in the latter table— The protocol map in that table is arranged based on data flows involving hosts of the monitored network. For each data flow observed on the monitored network, identified by client IP address (column 1), server IP address (column 2), IP protocol (column 3), client service port (column 4) and server service port (column 5), information may be stored on which application layer protocol is employed in the communication (column 6).

In the following some examples are provided of stateful signatures for the detection of the ftp protocol. These signatures identify a client request—server reply behavior: specifically they recognize a logon attempt, consisting, as specified by RFC 959, by the ftp command USER <SP> <username> <CRLF> followed by a server response.

The client request is matched by a signature of the type:

```
signature XX begin
    signature.message:"ftp client logon attempt"
    ip.destination_address: IN monitored network
    ip.source_address: IN not trusted network
    ip.protocol:tcp
    tcp.session_state: from client
    tap.payload.content: "USER", case_insensitive
    tcp.payload.content:"|0a|
    signature.action:trigger_response_signature:
XY,XZ
end
```

The two server responses are matched by signatures of the type:

```
signature XY begin
    signature.message:"ftp service detected, logon without password"
    signature.type: response
    signature.response.type: first reply packet in tcp session
    ip.source_address: IN monitored network
    ip.destination_address: IN not trusted network
    ip.protocol:tcp
    tcp.session_state: from server
    tcp.payload.content: "230", within 3
    tcp.payload.content:"|0a|
    signature.action:protocol_detected ftp 21
end
signature XZ begin
    signature.message:"ftp service detected, password requested"
    signature.type: response
    signature.response.type: first reply packet in tcp session
    ip.source_address: IN monitored network
    ip.destination_address: IN not trusted network
    ip.protocol:tcp
    tcp.session_state: from server
    tcp.payload.content: "331", within 3
    tcp.payload.content:"|0a|
    signature.action:protocol_detected ftp 21
end
```

Several of the features of a stateful signature language described above are used in this example.

The signature XX recognises a TCP data flow containing the case insensitive string "user", and a carriage return:

```
tcp.payload.content: "USER ", case_insensitive
tcp.payload.content: "|0a|"
    The data flow must be from the client side of the
tcp connection:
    tcp.session_state: from client
    The signature.action field in signature XX:
    signature.action:       trigger_response_signature:
XY, XZ
    specifies that, as a consequence of a successful
    match of signature XX, signatures XY and XZ are to be
    activated.
```

Signatures XY and XZ each recognize a specific server response code. The signature XY recognizes a 230 code, which signals a successful logon, while signature XZ recognizes a 331 code, which signals that a password is requested for logon. The strings "230" and "331" are required to be found within the first 3 bytes of the payload of a TCP packet. In the signature XY:

```
tcp.payload.content: "230", within 3
tcp.payload.content: "|0a|"
and in signature 48:
tcp.payload.content: "331", within 3
tcp.payload.content: "|0a|"
```

In both signatures, it is specified that signature is a response signature, that matches only the first reply packet seen in a TCP session in response to the packet that triggered the signature XX:

signature.type: response
signature.response.type: first reply packet in tcp session The applicant has verified that, by means of verification signatures such as XX, XY and XZ a protocol identification system is capable of identifying the FTP protocol with practically no false positives and false negatives.

The protocol identification method just described may be refined by means of flow characterization and classification of data flows. A limited set of features such as packet size, packet arrival times, tcp flags and other header information are gathered and statistics thereof are computed. The flow classification engine then classifies the data flows and services into a number of flow classes. Interactive traffic can be discriminated from bulk traffic. Additionally, a set of specific protocols, such as http and ssh, may be recognized with good accuracy without payload inspection.

The basic principles of flow classification performed without payload inspection are held to be known to those of skill in the art (as witnessed e.g. by Sun et al., "Statistical identification of encrypted web browsing traffic", IEEE Symposium on Security and Privacy, 2002, or by Zhang et al., "Detecting backdoors", USENIX Security Symposium, 2000). The information obtained by flow classification may be stored in a flow classification map similar to the latter protocol map considered in the foregoing, or in a service classification map similar to the former protocol considered in the foregoing map, where flow classification information are substituted to the protocol field of the tables discussed in the foregoing.

The flow or service classification map is correlated with the information gathered by signature based protocol identification to improve reliability of the identification. Furthermore, the signature language employed for protocol identification may be enriched to allow testing of flow and service classification information available in the flow and service classification map. As an example the following signature fragment is included:

flow.type: interactive

Figure 3:
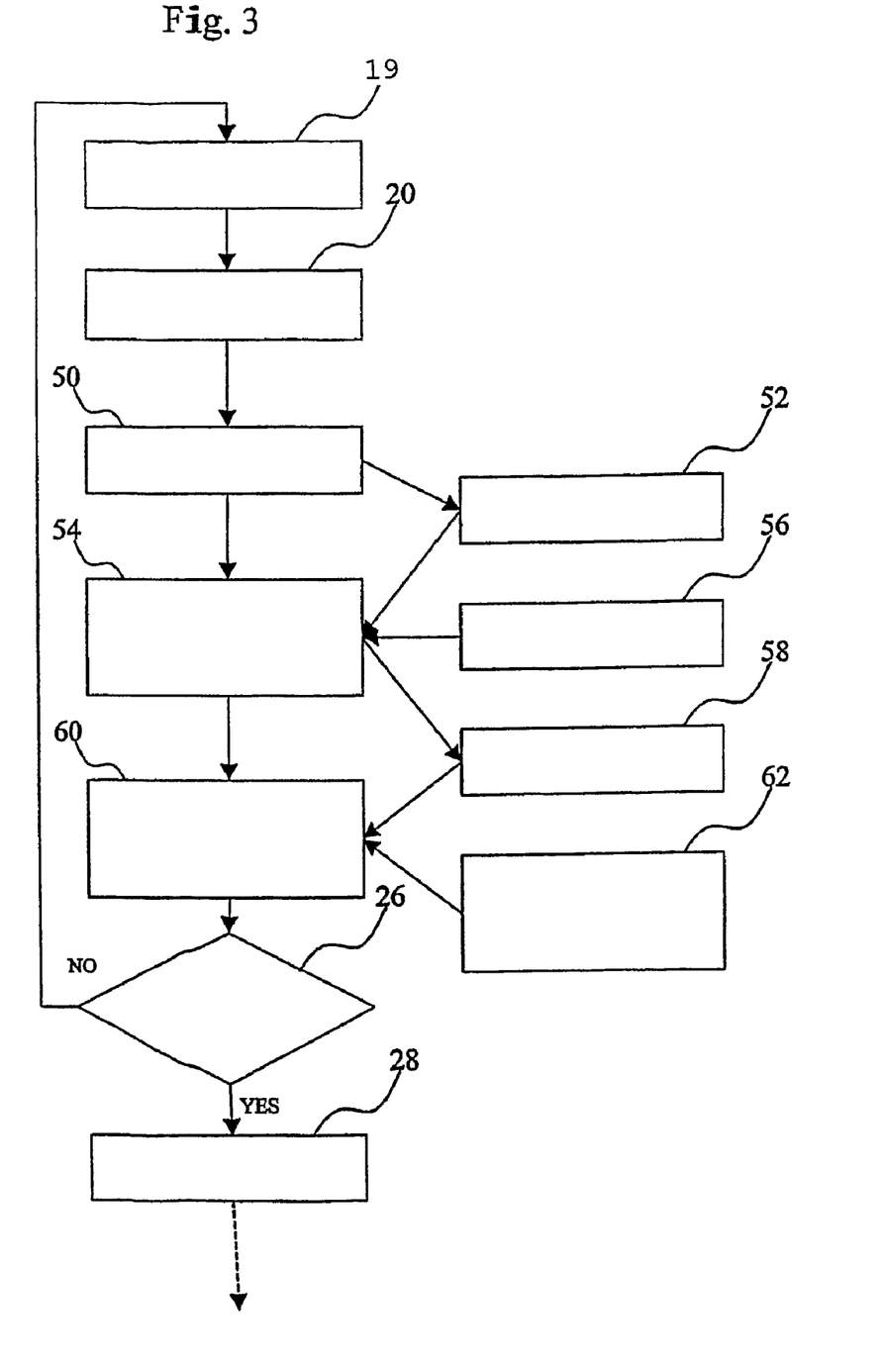
FIG. 3 is a flow chart illustrative of operation of a preferred embodiment of the protocol identification with statistical characterization.

FIG. 3 is a flow chart of a specific embodiment of the arrangement considered here.

As in the case of the embodiment of FIG. 2, the sniffer 14 captures the network packets in the step 19, and the packets are analyzed in the preprocessing step 20. In a step 50, the flow and service feature extraction engine updates a flow and service feature map 52 with information derived from the current packet. The feature map 52 is similar to the protocol maps considered in the foregoing and to a flow and service classification map 58, but it stores summary information on the traffic flow features needed for flow and service classification, such as statistics of packet size and of packet inter-arrival times. In a step 54 a flow and service classification engine analyses the feature map 52 and compares it with the flow classification knowledge base 56, to determine flow classification information for the current flow and/or service, which is stored in the flow and service classification map 58. In a step 60, a signature-matching engine then matches the current data flow against protocol identification signature set 62. The step 60 and the signature set 62 are expanded, with respect to the step 22 and the signature set 24 shown in FIG. 2, to make use of the flow and service classification map 58.

The signatures 62 may specify flow classification requirements, and in the step 60 the engine matches such signatures by comparing flow classification requirements with information on the current flow or service in classification map 58.

Processing then evolves through steps 26 and 28 and further, as in FIG. 2.

Figure 4:
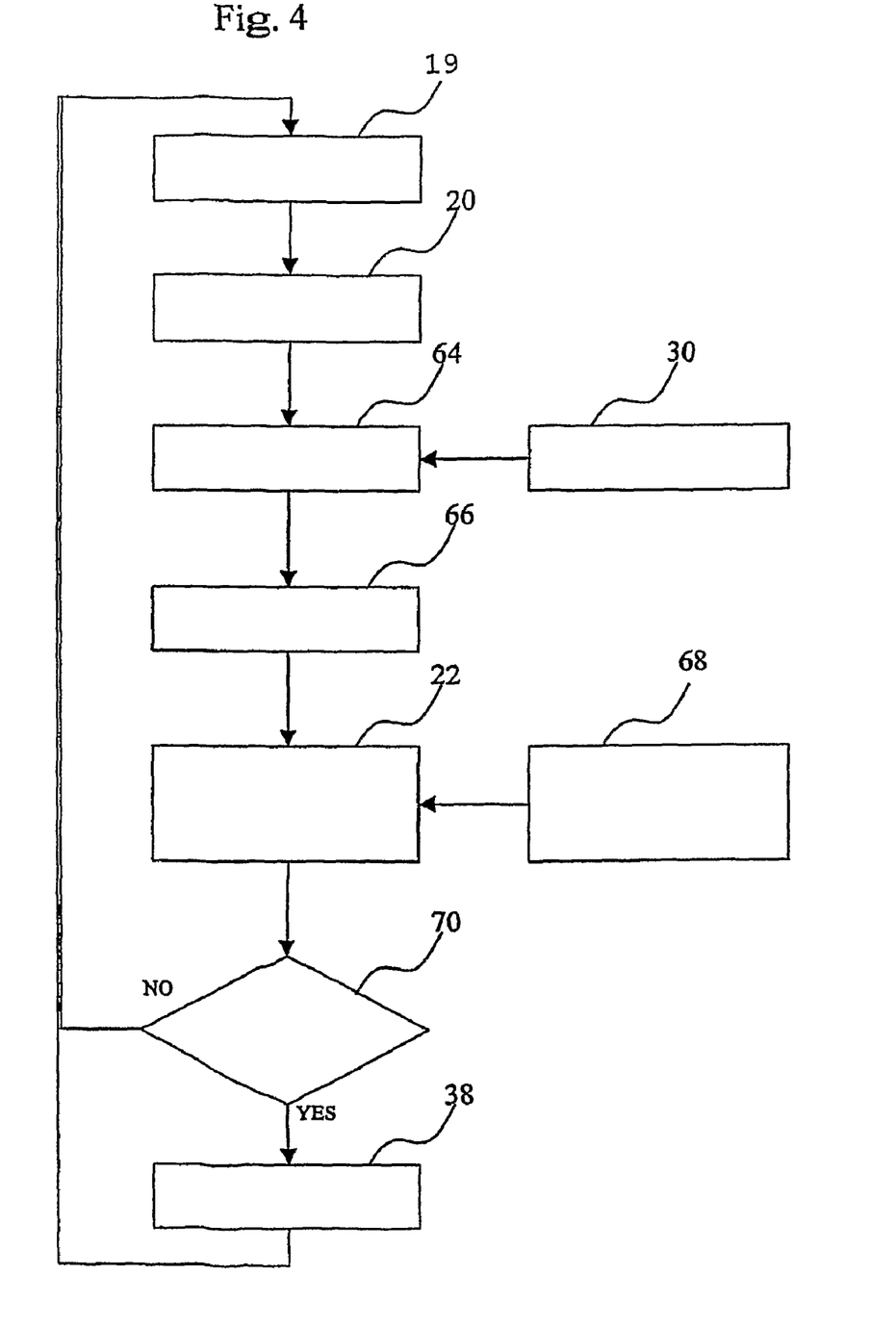
FIG. 4 is a flow chart illustrative of operation of a preferred embodiment of a network intrusion detection system as described herein.

FIG. 4 is a flow chart illustrative of operation of a network intrusion detection system making use of the protocol map 30 to improve reliability of misuse detection.

As in the protocol identification systems shown in FIG. 2 and in FIG. 3, and as in a conventional network intrusion detection system, in the step 19 the sniffer 14 captures traffic on the network 2; this is subsequently processed in the step 20. In a step 64, a lookup is performed for the current packet in the protocol map 30, in order to determine the protocol involved in the communication.

If no information on the current service port or data flow is found in protocol map 30, a protocol is chosen as in a conventional IDS, based on source and destination service port numbers. Step 66 is representative of preprocessing specific for the selected protocol, which may perform a plurality of decoding, normalization, re-assembly and analysis tasks relative to the current protocol.

As an example for the http protocol, URLs may be normalized by removing non-standard character encodings, TCP stream reassembly may be performed on the client side of the connection but not on the server side to reduce computation and storage costs, and anomaly based security events may be generated if the http method is too long, which may be indication of a buffer overflow attempt. In the step 22 the signature matching engine performs matching of the current data flow against signature set 68, the misuse detection signature set for the selected protocol. Furthermore, in a step 70 a check is made as to whether a misuse was detected in the step 22, and, if that is the case, a security event is generated in a step 38.

Examination of FIGS. 2 and 4 shows that the protocol identification system described and a network intrusion detection system perform essentially similar processing on the traffic observed on the monitored network, and therefore can efficiently be integrated into a single system. A sniffer, a preprocessor, a signature-matching engine, and a security event generation engine are present in both systems.

Figure 5:
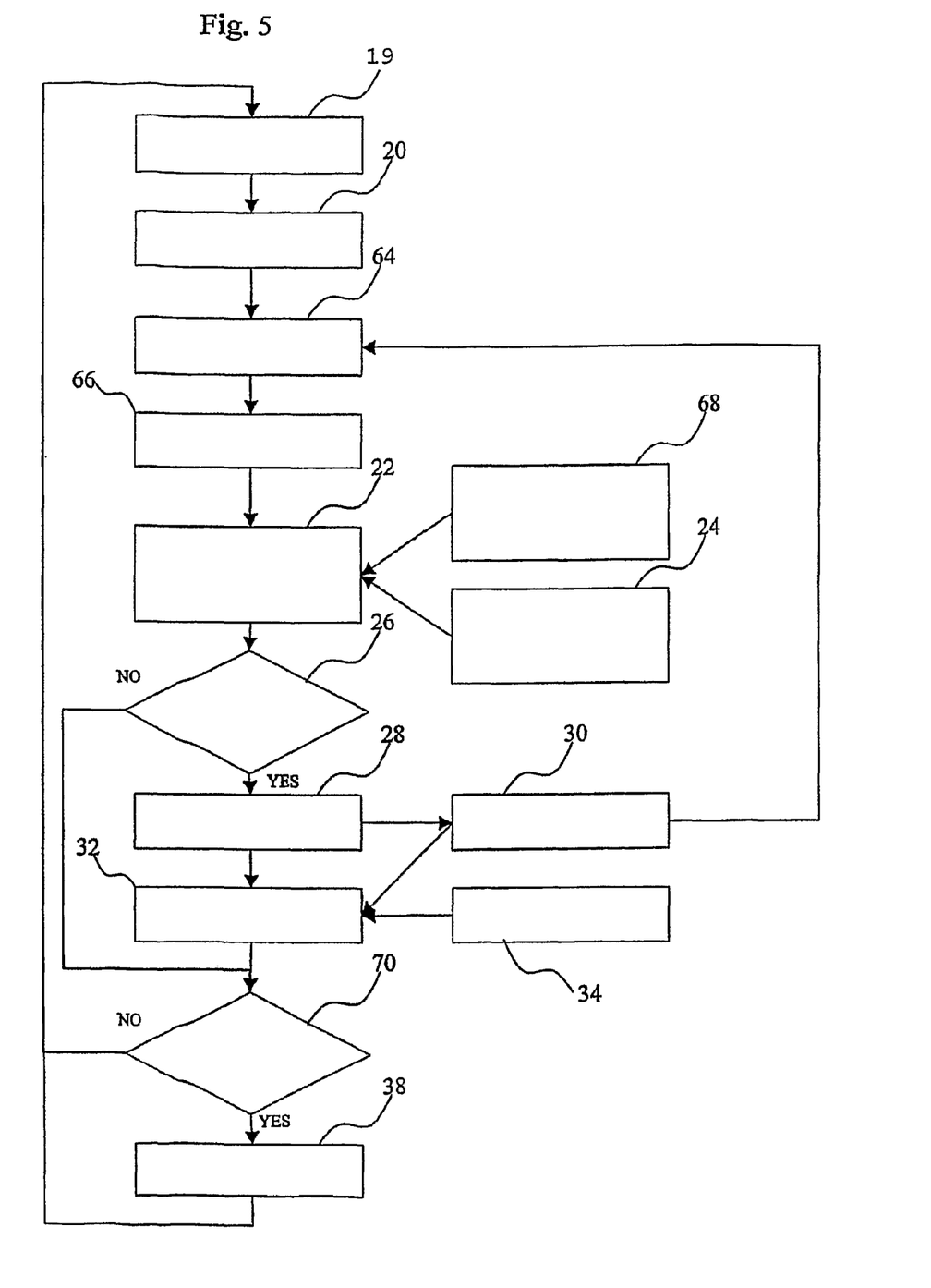
FIG. 5 is another flow chart illustrative of the integration of a protocol identification feature in a network intrusion detection system.

FIG. 5 is a flow chart exemplary of operation of a network intrusion detection system with integrated protocol identification.

In FIG. 5, processing proceeds through the sniffer 14, the preprocessor, through protocol selection in the step 64, and through the protocol specific preprocessing 66 as in the IDS illustrated in FIG. 4.

Further in FIG. 5, in the step 22 the signature-matching engine performs matching of the current data flow against both the protocol identification signature set 24, and the misuse detection signature set for the selected protocol 68.

Although the signature sets 24 and 68 are shown separately in the diagram, they are not separately matched against the data flow by engine in the step 22; rather, the sets 24 and 68 are integrated into a single signature set, and in the step 22 the engine performs set-wise matching of the data flow against the entire signature set.

Again, in a block 26 a test is made whether a protocol was detected and, if it was, the protocol map 30 is updated in the step 28, while in the step 32 the policy engine compares the detected protocol with network policy 34. Further in the diagram, in a step 70 a check is made as to whether a misuse was detected, either by the signature matching engine (in the step 22), or by the policy engine (in the step 32). If that is the case, a security event is generated in the step 38.

Of course, without prejudice to the underlying principles of the invention, the details and the embodiments may vary, even significantly, with respect to what has been described and shown by way of example only, without departing from the scope of invention as defined by the annexed claims.

The invention claimed is:

1. A method of providing intrusion detection in a network wherein data flows are exchanged using associated network ports and application layer protocols, comprising the steps of:
    monitoring data flows in said network;
    detecting information relating to application layer protocols associated with said monitored data flows independently of said network ports; and
    providing intrusion detection on said monitored data flows based on said detected information relating to said application layer protocols independently of any predefined association between said network ports and said application layer protocols,
    wherein said step of detecting information relating to application layer protocols involved in said data flows comprises characterizing and classifying data flows related to each server application in said network.

2. The method of claim 1, wherein said step of detecting information relating to application layer protocols comprises passive observation of network traffic.

3. The method of claim 1, wherein said step of detecting information relating to application layer protocols comprises using signature-matching techniques.

4. The method of claims 3, wherein said signature-matching is performed by comparing monitored traffic with a set of protocol detection signatures having the following characteristics:
    the set of signatures is specified in a language similar to the signature language used to specify misuse signatures in said network intrusion detection system, and
    each said signature specifies a respective protocol that is detected if the signature is triggered.

5. The method of claim 4, wherein each said signature is designed to attempt to match a pattern that is unique to a given protocol and at the same time is frequently used in said protocol.

6. The method of claim 4, comprising the step of using at least one of the signatures identifying behavior frequently present in server responses and signatures identifying common client request-server reply behavior.

7. The method of claim 4, comprising leaving out signatures exclusively matching a pattern in client behavior.

8. The method of claim 1, wherein said step of detecting information relating to application layer protocols in said data flows comprises the step of identifying at least one protocol in a given data flow.

9. The method of claim 1, wherein said step of providing intrusion detection comprises signature-based detection of misuse by matching at least one of a given data packet and data flow regardless of the service ports involved, based on said information on application layer protocols.

10. The method of claim 1, comprising providing intrusion detection based on a plurality of predefined sets of analysis tasks and misuse signatures for a plurality of said protocols, and comprises selecting out of said plurality a set related to at least one protocol in a given data flow and at least one of the steps of:
    performing over said data flow the selected set of analysis tasks; and
    performing signature matching over said data flow against the selected set of misuse signatures.

11. The method of claim 1, wherein said steps of detecting information relating to application layer protocols and providing intrusion detection are performed within the same functional module and employing the same functional blocks of packet capture, preprocessing and signature matching.

12. The method of claim 1, wherein said step of characterizing and classifying data flows comprises monitoring features from the group of:
    packet size, packet arrival times, TCP flags and header information.

13. The method of claim 1, wherein said step of characterizing and classifying data flows comprises classifying data flows and services into a number of flow classes.

14. The method of claim 1, wherein said step of characterizing and classifying data flows comprises at least one of discriminating between interactive and non-interactive traffic and identifying specific protocols.

15. The method of claim 1, wherein said step of detecting information relating to application layer protocols in said data flows comprises producing a map of associations between application layer protocols and network ports present in said network, and said step of providing intrusion detection is performed on said associated network ports.

16. The method of claim 1, wherein said step of providing intrusion detection based on said information relating to application layer protocols comprises the steps of:
    establishing a network policy, and
    generating a security event whenever a protocol is detected in violation of said network policy.

17. A system for providing intrusion detection in a network wherein data flows are exchanged using associated network ports and application layer protocols, comprising:
    at least one computer;
    a monitoring module, using said at least one computer, for monitoring data flows in said network;

a protocol identification engine, using said at least one computer, for detecting information relating to application layer protocols associated with said monitored data flows; and an intrusion detection module, using said at least one computer, for providing intrusion detection on said monitored data flows based on said detected information relating to said application layer protocols independently of any predefined association between said network ports and said application layer protocols, wherein said protocol identification engine is configured for detecting information on application layer protocols in said data flows by characterizing and classifying data flows related to each server application in said network.

18. The system of claim 17, wherein said monitoring module is a module configured for passive observation of network traffic.

19. The system of claim 18, wherein said module is a sniffer.

20. The system of claim 17, wherein said protocol identification engine comprises a signature-matching feature.

21. The system of claim 20, comprising a configuration for performing said signature-matching by comparing monitored traffic with a set of protocol detection signatures having the following characteristics:
the set of signatures is specified in a language similar to the signature language used to specify misuse signatures in said network intrusion detection system, and
each said signature specifies a respective protocol that is detected if the signature is triggered.

22. The system of claim 21, wherein each said signature is designed to attempt to match a pattern that is unique to a given protocol and at the same time is frequently used in said protocol.

23. The system of claim 21, comprising a configuration for using at least one of the signatures identifying behavior frequently present in server responses and signatures identifying common client request-server reply behavior.

24. The system of claim 21, comprising a configuration for leaving out signatures exclusively matching a pattern in client behavior.

25. The system of claim 17, wherein said protocol identification engine is configured for detecting information on application layer protocols in said data flows by identifying at least one protocol in a given data flow.

26. The system of claim 17, wherein said intrusion detection module is configured for providing intrusion detection by signature-based detection of misuse by matching at least one of a given data packet and data flow regardless of the service ports involved, based on said information on application layer protocols.

27. The system of claim 17, wherein said intrusion detection module is configured for providing intrusion detection based on a plurality of predefined sets of analysis tasks and misuse signatures for a plurality of said protocols, said intrusion detection module being further configured for selecting out of said plurality a set related to at least one protocol in a given data flow and carrying out at least one of the steps of:

performing over said data flow the selected set of analysis tasks, and performing signature matching over said data flow against the selected set of misuse signatures.

28. The system of claim 17, wherein said protocol identification engine and said intrusion detection module are integrated to a common functional module and employ a common set of functional blocks of packet capture, preprocessing and signature matching.

29. The system of claim 17, wherein said protocol identification engine is configured for monitoring features from the group of: packet size, packet arrival times, TCP flags and header information.

30. The system of claim 17, wherein said protocol identification engine is configured for characterizing and classifying data flows by classifying data flows and services into a number of flow classes.

31. The system of claim 17, wherein said protocol identification engine is configured for characterizing and classifying data by at least one of discriminating between interactive and non-interactive traffic and identifying specific protocols.

32. The system of claim 17, wherein said protocol identification engine is configured for producing a map of associations between application layer protocols and network ports present in said network, and said intrusion detection module provides intrusion detection on said associated network ports.

33. The system of claim 17, wherein said intrusion detection module is configured for:
establishing a network policy, and
generating a security event whenever a protocol is detected in violation of said network policy.

34. A communication network comprising the system according to claim 17.

35. A non-transitory computer-readable storage medium encoded with a computer program product loadable into a memory of at least one computer, the computer program product containing software code portions for performing, when the computer program product is run on the at least one computer, a method of providing intrusion detection in a network wherein data flows are exchanged using associated network ports and application layer protocols, comprising the steps of:
monitoring data flows in said network;
detecting information relating to application layer protocols associated with said monitored data flows independently of said network ports; and
providing intrusion detection on said monitored data flows based on said detected information relating to said application layer protocols independently of any predefined association between said network ports and said application layer protocols,
wherein said step of detecting information relating to application layer protocols involved in said data flows comprises characterizing and classifying data flows related to each server application in said network.

* * * * *